United States Patent
Saito et al.

(10) Patent No.: US 11,460,103 B2
(45) Date of Patent: Oct. 4, 2022

(54) LOCK-UP DISENGAGEMENT CONTROL DEVICE FOR AUTOMATIC TRANSMISSION

(71) Applicants: JATCO Ltd, Fuji (JP); NISSAN MOTOR CO., LTD., Yokohama (JP)

(72) Inventors: Koji Saito, Machida (JP); Akira Nakainkyo, Numazu (JP); Naoyasu Ikeda, Atsugi (JP); Xuming Wang, Atsugi (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 147 days.

(21) Appl. No.: 16/963,561

(22) PCT Filed: Jan. 17, 2019

(86) PCT No.: PCT/JP2019/001175
§ 371 (c)(1),
(2) Date: Jul. 21, 2020

(87) PCT Pub. No.: WO2019/146475
PCT Pub. Date: Aug. 1, 2019

(65) Prior Publication Data
US 2020/0355264 A1 Nov. 12, 2020

(30) Foreign Application Priority Data
Jan. 23, 2018 (JP) .............................. JP2018-008551

(51) Int. Cl.
*F16H 61/14* (2006.01)
(52) U.S. Cl.
CPC ..... *F16H 61/143* (2013.01); *F16H 2061/145* (2013.01); *F16H 2061/147* (2013.01)

(58) Field of Classification Search
CPC ............. F16H 61/143; F16H 2061/145; F16H 2061/147
See application file for complete search history.

(56) References Cited

U.S. PATENT DOCUMENTS

2007/0066444 A1* 3/2007 Matsudaira ......... F16H 61/0213
477/115
2018/0172149 A1* 6/2018 Miyazono ............. F16H 61/662

FOREIGN PATENT DOCUMENTS

JP 2014-196769 A 10/2014
JP 2017-116056 A 6/2017

* cited by examiner

*Primary Examiner* — Ernesto A Suarez
*Assistant Examiner* — Lori Wu
(74) *Attorney, Agent, or Firm* — Foley & Lardner LLP

(57) ABSTRACT

A lockup disengagement control device for an automatic transmission including a torque converter including a lockup clutch, and a lockup control section, the lockup disengagement control device includes: when a brake is operated from a brake OFF to a brake ON during a coast traveling in an engagement state of the lockup clutch, the lockup control section being configured to sense an initial deceleration by the brake ON operation, and to set a lockup release vehicle speed to be higher as an absolute value of the initial deceleration is greater, and when a vehicle speed is sensed to be equal to or smaller than the set lockup release vehicle speed in a middle of a brake deceleration scene by the brake ON operation, the lockup control section being configured to disengage the lockup clutch.

6 Claims, 9 Drawing Sheets

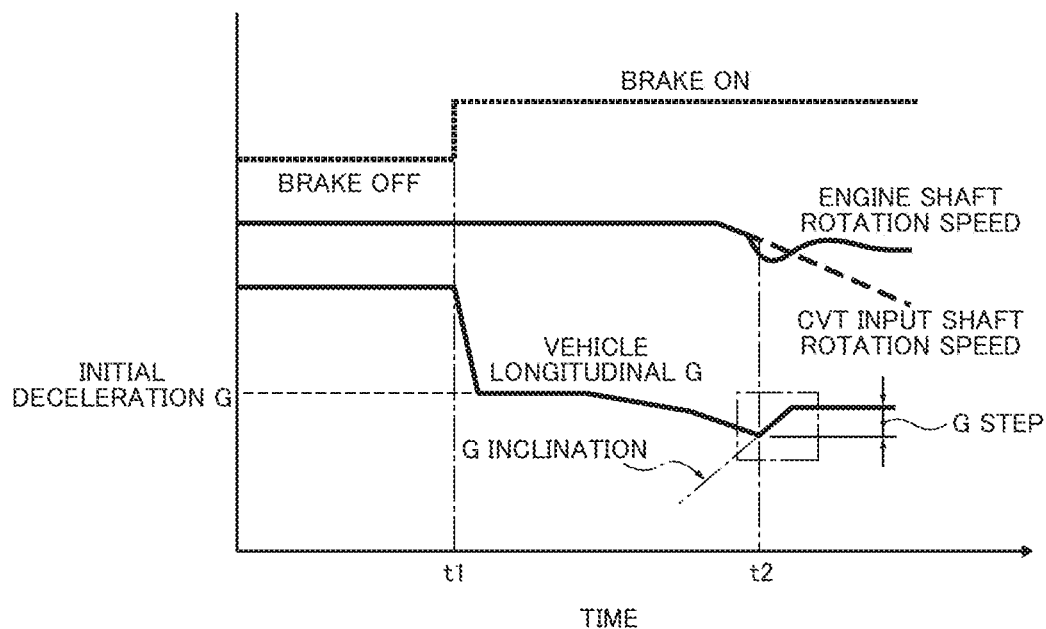
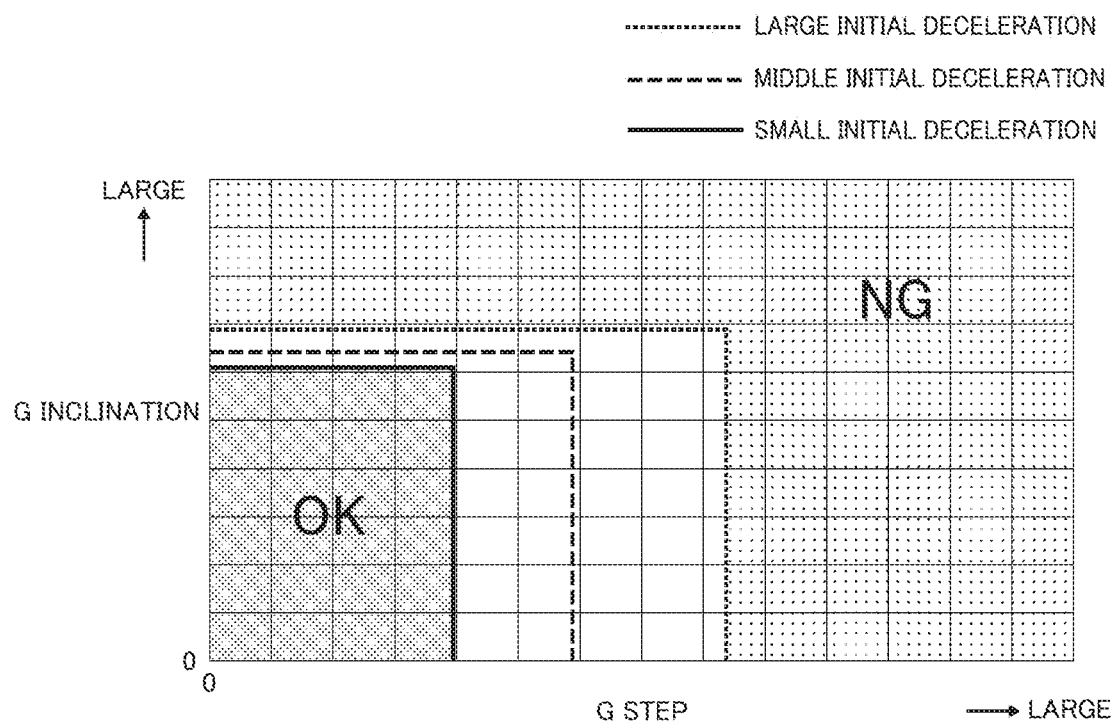

US 11,460,103 B2

LOCK-UP DISENGAGEMENT CONTROL DEVICE FOR AUTOMATIC TRANSMISSION

TECHNICAL FIELD

This invention relates to a lockup disengagement control device for an automatic transmission which is configured to perform a disengagement control of a lockup clutch of a torque converter disposed between a traveling driving source and a shift mechanism.

Background Art

Conventionally, there is known a control device for a continuously variable transmission which is configured to disengage a lockup clutch when it is judged that a vehicle speed is equal to or smaller than a predetermined lockup release vehicle speed during a deceleration traveling state in which the lockup clutch is engaged (for example, patent document 1).

PRIOR ART DOCUMENT

Patent Document

Patent Document 1: Japanese Patent Application Publication No. 2014-196769

SUMMARY OF THE INVENTION

Problems which the Invention is Intended to Solve

In the conventional device, there are problems as follows. In the brake deceleration scene, when the lockup clutch is disengaged by using a previously set lockup release vehicle speed, the vehicle behavior may be varied. There is a room for the setting of the lockup release vehicle speed.

It is, therefore, an object of the present invention to dissolve the above-described problems, and to suppress a variation of a vehicle behavior generated by the disengagement of the lockup clutch in the brake deceleration scene, to a level equal to or smaller than a permission level of an occupant.

Means for Solving the Problem

For attaining the above-described objects, a lockup disengagement control device for an automatic transmission Including a torque converter which is disposed between a traveling driving source and a shift mechanism, and which Includes a lockup clutch configured to be engaged to directly connect an torque converter input shaft and a torque converter output shaft, and a lockup control section configured to perform a lockup engagement control and a lockup disengagement control of the lockup clutch, the lockup disengagement control device comprises: when a brake is operated from a brake OFF to a brake ON during a coast traveling in an engagement state of the lockup clutch, the lockup control section being configured to sense an initial deceleration by the brake ON operation, and to set a lockup release vehicle speed to be higher as an absolute value of the initial deceleration is greater, and when a vehicle speed is sensed to be equal to or smaller than the set lockup release vehicle speed in a middle of a brake deceleration scene by the brake ON operation, the lockup control section being configured to disengage the lockup clutch.

Benefit of the Invention

For example, in a case where the lockup release vehicle speed is set by using the various parameters, the checking man-hour of the real device are needed for the various parameter conditions. One lockup release vehicle speed is set as a substitute with respect to the sensory evaluation of the variation of the vehicle behavior which is varied in accordance with the condition. Accordingly, it is difficult to set the appropriate lockup release vehicle speed.

The inventors recognized that the magnitude of the initial deceleration G by the brake ON operation largely influence on the sensory evaluation of the variation of the vehicle behavior at the setting of the lockup release vehicle speed. Accordingly, when a brake is operated from a brake OFF to a brake ON in an engagement state of the lockup clutch, the lockup control section is configured to sense an initial deceleration by the brake ON operation, and to set a lockup release vehicle speed to be higher as an absolute value of the initial deceleration is greater.

Therefore, at the brake deceleration scene, it is possible to suppress the variation of the vehicle behavior generated by the disengagement of the lockup clutch, to a level equal to or smaller than a permission level of the occupant.

BRIEF DESCRIPTION OF DRAWINGS

FIG. 4 is a time chart showing characteristics of a brake, an engine speed, a CVT input shaft rotation speed, and a longitudinal G at the lockup disengagement in a brake deceleration scene from a brake OFF to a brake ON.

FIG. 5 is a region characteristic view showing a vehicle behavior OK region and a vehicle behavior NG region at a large initial deceleration, a middle initial deceleration, and a small initial deceleration in a coordinate plane in which a horizontal axis is a G step, and a vertical axis is a G Inclination.

DESCRIPTION OF EMBODIMENTS

Hereinafter, a lockup disengagement control device for an automatic transmission according to a first embodiment of the present invention is explained with reference to the drawings.

First Embodiment

Firstly, a configuration is explained.

The lockup disengagement control device according to the first embodiment Is applied to an engine vehicle including a belt-type continuously variable transmission (one example of an automatic transmission) including a torque converter, a forward and rearward switching mechanism, a variator, and a final speed reduction mechanism. Hereinafter, the configuration according to the first embodiment is explained with reference to "Overall System Configuration", "Lockup Disengagement Control Device Configuration", and "Lockup Disengagement Control Operation Configuration".

[Overall System Configuration]

Figure 1:
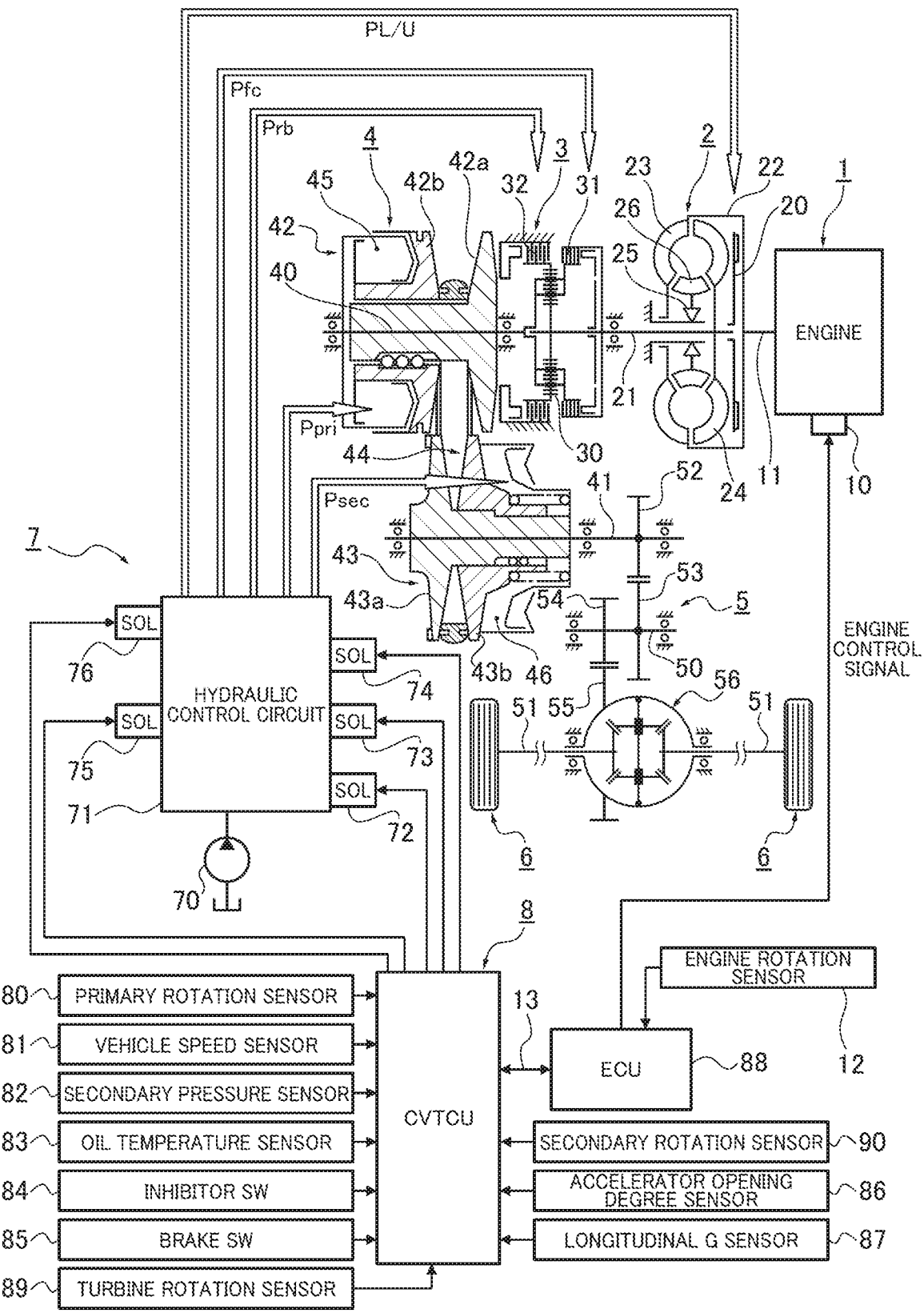
FIG. 1 is an overall system view showing a driving system and a control system of an engine vehicle to which a lockup disengagement control device of an automatic transmission according to a first embodiment.

FIG. 1 shows a driving system and a control system of the engine vehicle to which the lockup disengagement control device for the automatic transmission according to the first embodiment is applied. Hereinafter, the overall system configuration is explained with reference to FIG. 1.

As shown in FIG. 1, the driving system of the engine vehicle includes an engine 1, a torque converter 2, a forward and rearward switching mechanism 3, a variator 4, a final speed reduction mechanism 5, and driving wheels 6, 6. In this case, the belt-type continuously transmission CVT Includes the torque converter 2, the forward and rearward switching mechanism 3, the variator 4, and the final speed reduction mechanism 5 which are received within a transmission case (not shown).

An output torque of the engine 1 can be controlled by an engine control signal from the outside, in addition to a control of an output torque by an accelerator operation by a driver. This engine 1 includes an output torque control actuator 10 configured to perform a torque control by a throttle valve opening and closing operation, a fuel cut operation, and so on.

The torque converter 2 is a start element of a fluid coupling having a torque increasing function and a torque variation absorbing function. The torque converter 2 includes a lockup clutch 20 configured to directly connect an engine output shaft 11 (=torque converter input shaft) and a torque converter output shaft 21 when the torque increasing function and the torque variation absorbing function are not needed. This torque converter 2 includes, as constituting elements, a pump impeller 23 connected through a converter housing 22 to the engine output shaft 11; a turbine runner 24 connected to the torque converter output shaft 21; and a stator 26 provided through a one-way clutch 25 to a case.

The forward and rearward switching mechanism 3 is a mechanism configured to switch an input rotation direction to the variator 4 between a normal rotation direction at the forward traveling, and a reverse rotation direction at the rearward traveling. This forward and rearward switching mechanism 3 includes a double pinion type planetary gear 30; a forward clutch 31 constituted by a plurality of clutch plates; and a rearward brake 32 constituted by a plurality of clutch plates. The forward clutch 31 is configured to be engaged by a forward clutch pressure Pfc at a selection of a forward traveling range such as a D range. The rearward brake 32 is configured to be engaged by a rearward brake pressure Prb at a selection of a rearward traveling range such as an R range. Besides, the forward clutch 31 and the rearward brake 32 are configured to be disengaged at a selection of an N (neutral) range by draining the forward clutch pressure Pfc and the rearward brake pressure Prb.

The variator 4 includes a primary pulley 42; a secondary pulley 43; and a pulley belt 44. The variator 4 has a continuously variable shift function to continuously vary a transmission gear ratio (a ratio between the variator input rotation speed and the variator output rotation speed) by variations of belt contact radii. The primary pulley 42 includes a fixed pulley 42a and a sliding pulley 42b which are coaxially disposed on a variator input shaft 40. The sliding pulley 42b is configured to be slid by a primary pressure Ppri Introduced into a primary pressure chamber 45. The secondary pulley 43 includes a fixed pulley 43a and a sliding pulley 43b which are coaxially disposed on a variator output shaft 41. The sliding pulley 43b is configured to be slid by a secondary pressure Psec introduced into a secondary pressure chamber 46. The pulley belt 44 is wound between a V-shaped sheave surface of the primary pulley 42 and a V-shaped sheave surface of the secondary pulley 43. This pulley belt 44 is constituted by a pair of stacked rings formed by stacking a plurality of annular rings from inside to outside, and a plurality of elements which are made of stamping plates, and which are mounted to be stacked in an annular shape by being sandwiched by the pair of the stacked rings. Besides, the pulley belt 44 may be a chain type belt formed by connecting a plurality of chain elements arranged in the pulley motion direction, by pins penetrating in the pulley axis direction.

The final speed reduction mechanism 5 is a mechanism which is configured to decrease the speed of the variator output rotation from the variator output shaft 41, which has a differential function, and which is configured to transmit to the left and right driving wheels 6 and 6. This final speed reduction mechanism 5 includes, as the speed reduction mechanism, an output gear 52 provided on the variator output shaft 41; an idler gear 53 and a reduction gear 54 which are provided on an idler shaft 50; and a final gear 55 provided at an outer circumference position of a differential case. Moreover, the final speed reduction mechanism 5 includes, as the differential gear mechanism, a differential gear 56 disposed between left and right drive shafts 51 and 51.

As shown in FIG. 1, the control system of the engine vehicle includes a hydraulic control unit 7 which represents a hydraulic control system; and a CVT control unit 8 which represents an electric control system.

The hydraulic control unit 7 is a unit configured to control the primary pressure Ppri introduced to the primary pressure chamber 45, the secondary pressure Psec introduced to the secondary pressure chamber 46, and the forward clutch pressure Pfc to the forward clutch 31, the rearward brake pressure Prb to the rearward brake 32, and so on. This hydraulic control unit 7 includes an oil pump 70 configured to be driven and rotated by the engine 1 which is the driving source for the traveling; and a hydraulic control circuit 71 configured to control various control pressures based on the discharge pressure from the oil pump 70. The hydraulic control circuit 71 includes a line pressure solenoid valve 72; a primary pressure solenoid valve 73; a secondary pressure solenoid valve 74; a select solenoid valve 75; a lockup pressure solenoid valve 76, and so on. Besides, the pressures of the solenoid valves 72, 73, 74, 75, and 76 are controlled to command pressures by control command values outputted from the CVT control unit 8.

The line pressure solenoid valve 72 is configured to control the discharge pressure from the oil pump 70 to a commanded line pressure PL in accordance with a line pressure command value outputted from the CVT control unit 8. This line pressure PL Is a source pressure when the various control pressures are controlled. The line pressure PL is a hydraulic pressure for suppressing a belt slippage and a clutch slippage with respect to the torque transmitted in the driving system.

The primary pressure solenoid valve 73 is configured to control and decrease to the commanded primary pressure Ppri based on the line pressure PL in accordance with the primary pressure command value outputted from the CVT control unit 8. The secondary pressure solenoid valve 74 is configured to control and decrease to the commanded secondary pressure Psec based on the line pressure PL in accordance with the secondary pressure command value outputted from the CVT control unit 8.

The select solenoid valve 75 is configured to control and decrease to the commanded forward clutch pressure Pfc or the commanded rearward brake pressure Prb based on the line pressure PL in accordance with the forward clutch pressure command value or the rearward brake pressure command value outputted from the CVT control unit 8.

The lockup pressure difference solenoid valve 76 is configured to control a lockup control pressure PL/U to engage, slip-engage, or disengage the lockup clutch 20 in accordance with a lockup pressure command value outputted from the CVT control unit 8.

The CVT control unit 8 is configured to perform the line pressure control, the shift control, the forward and rearward switching control, the lockup control, and so on. In the line pressure control, the CVT control unit 8 is configured to output a command value to attain a target line pressure according to the accelerator opening degree and so on, to the line pressure solenoid valve 72. In the shift control, the CVT control unit 8 is configured to determine the target transmission gear ratio (the target primary solenoid rotation Npri*), and to output a command value to attain the determined target transmission gear ratio (the target primary solenoid rotation Npri*), to the primary pressure solenoid valve 73 and the secondary pressure solenoid valve 74. In the forward and rearward switching control, the CVT control unit 8 is configured to output a command value to control the engagement/disengagement of the forward clutch 31 and the rearward brake 32 in accordance with the selected range position, to the select solenoid valve 75. In the lockup control, the CVT control unit 8 is configured to output a command value to control the lockup control pressure PL/U to engage, slip-engage, or disengage the lockup clutch 20, to the lockup pressure solenoid valve 76.

The CVT control unit 8 receives sensor information and switch information from a primary rotation sensor 80, a vehicle speed sensor 81, a secondary pressure sensor 82, an oil temperature sensor 83, an inhibitor switch 84, a brake switch 85, an accelerator opening degree sensor 86, a longitudinal G sensor 87, a turbine rotation sensor 89, a secondary rotation sensor 90, and so on.

Moreover, an engine control unit 88 receives sensor Information from an engine speed sensor 12. The CVT control unit 8 is configured to receive, for example, the engine torque information from the engine control unit 88, and to output an engine torque request to the engine control unit 88. Besides, the CVT control unit 8 and the engine control unit 88 are connected by CAN communication lines 13 to exchange the information.

Figure 2:
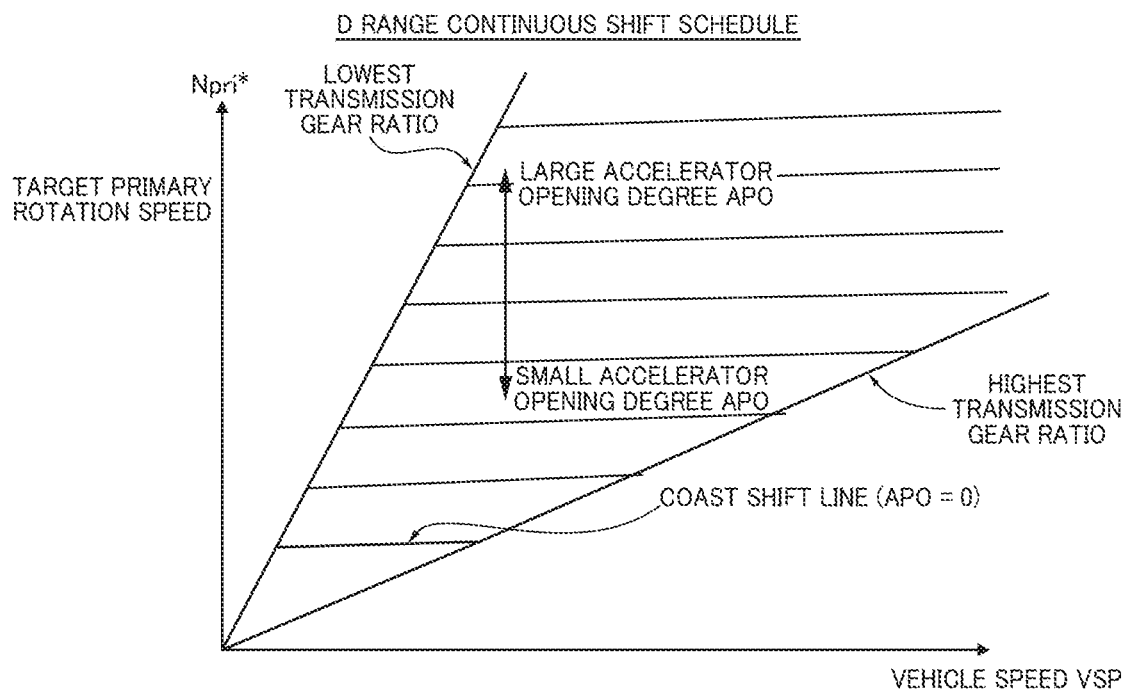
FIG. 2 is a shift schedule diagram showing one example of a D range continuous shift schedule used when a continuous shift control in an automatic shift mode is performed by a variator.

FIG. 2 shows one example of a D range continuous shift schedule used when the continuous shift control is performed by the variator 4 at the automatic shift mode at the selection of the D range.

The "D range shift mode" is the automatic shift mode to automatically vary the transmission gear ratio continuously in accordance with the driving state of the vehicle. In the shift control at the "D range shift mode", the target primary rotation speed Npri* is determined by a driving point (VSP, APO) determined on the D range continuous shift schedule of FIG. 2 from the vehicle speed VSP (the vehicle speed sensor 81), and the accelerator opening degree APO (the accelerator opening degree sensor 86). The pulley hydraulic control is performed so that the primary rotation speed Npri from the primary rotation sensor 80 corresponds to the target primary rotation speed Npri*.

That is, as shown in FIG. 2, the D range continuous shift schedule used in the "D range shift mode" is set so that the transmission gear ratio is continuously varied in a range of a transmission gear ratio width from a lowest transmission gear ratio to a highest transmission gear ratio, in accordance with a driving point (VSP, APO). For example, in a case where the accelerator depression is performed when the vehicle speed VSP is constant, the target primary rotation speed Npri* is increased to be shifted in a downshift direction. On the other hand, in a case where the accelerator return operation Is performed when the vehicle speed VSP is constant, the target primary rotation speed Npri* is decreased to be shifted in the upshift direction. Moreover, when the accelerator opening degree APO is constant, the shift is performed in the upshift direction by the increase of the vehicle speed VSP. Furthermore, when the accelerator opening degree APO is constant, the shift is performed in the downshift direction by the decrease of the vehicle speed VSP.

[Lockup Disengagement Control Device Configuration]

Figure 3:
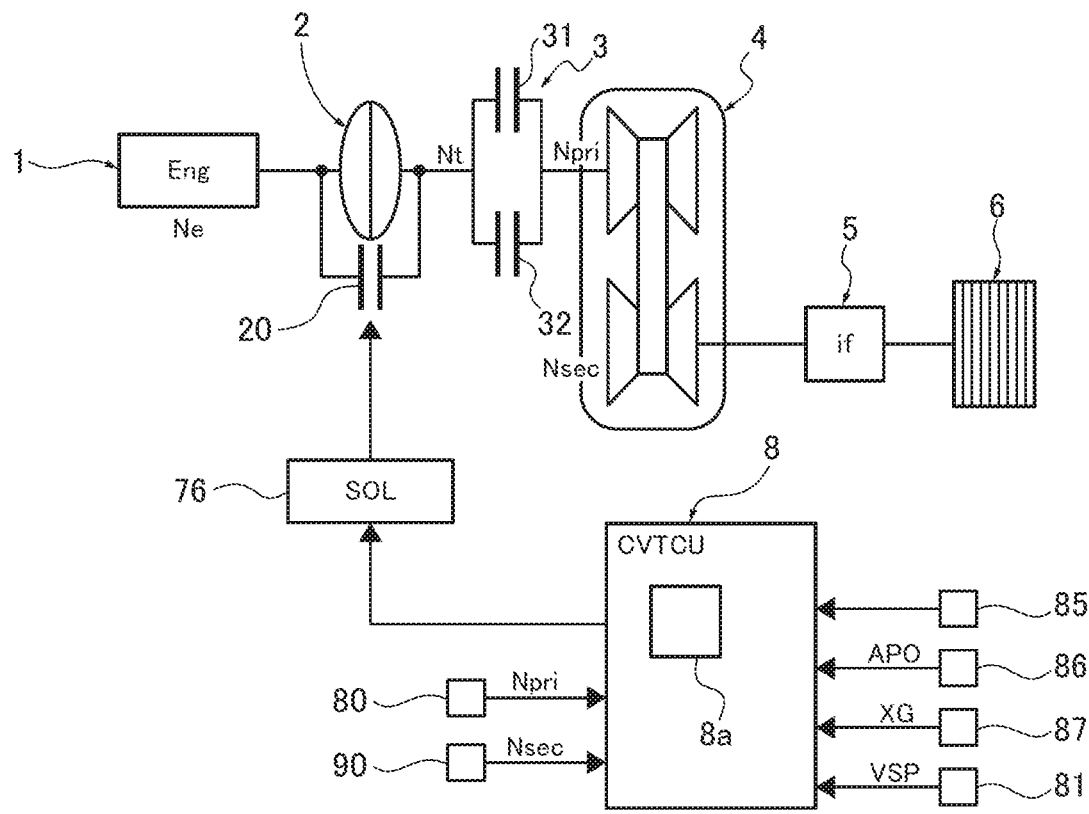
FIG. 3 is a configuration view showing a main part of the lockup disengagement control device according to the first embodiment.

FIG. 3 shows the lockup disengagement control device according to the first embodiment. Hereinafter, the lockup disengagement control device configuration is explained with reference to FIG. 3.

As shown in FIG. 3, the lockup disengagement control device includes the lockup clutch 20, the lockup 2s solenoid valve 76, and the lockup control section 8a. Moreover, the lockup disengagement control device includes, as main sensor/switches configured to provide the input information to the lockup control section 8a, the primary rotation sensor 80, the vehicle speed sensor 81, the brake switch 85, the accelerator opening degree sensor 86, the longitudinal G sensor 87, and the secondary rotation sensor 90.

The lockup clutch 20 is provided in parallel with the torque converter 2. When the vehicle is started by the selection operation from the N range to the D range by the selection lever 91, for example, when the vehicle speed becomes a lockup start vehicle speed, the lockup clutch 20 in the disengaged state at the start of the vehicle start is engaged by the lockup engagement control. Conversely, the lockup clutch 20 in the engaged state at the D range traveling is disengaged when the vehicle speed is decreased to a lockup release vehicle speed by the deceleration traveling.

The lockup solenoid valve 76 is a valve configured to control a pressure difference (lockup control pressure PL/U) of the lockup clutch 20 by the command value from the CVT control unit 8. The lockup solenoid valve 76 is configured to switch the clutch state among the engagement state, the slip-engagement state, and the disengagement state.

The primary rotation sensor 80 and the secondary rotation sensor 90 are configured to sense an actual transmission gear ratio of the variator 4 by a ratio of the secondary rotation speed Nsec to the primary rotation speed Npri. The vehicle speed sensor 81 is configured to sense the vehicle speed VSP which is a vehicle speed when the engine vehicle travels. The brake switch 85 is configured to sense the brake operation by the change of the switch signal from the OFF state to the ON state. The accelerator opening degree sensor 86 is configured to sense the accelerator opening degree APO which is an accelerator operation amount by the driver. The longitudinal G sensor 87 is configured to sense an acceleration+XG and a deceleration −XG of the traveling direction of the vehicle during the traveling.

The lockup control section 8a is provided to the CVT control unit 8 which is an electrical control device of the belt-type continuously variable transmission CVT. The lockup control section 8a is configured to perform the lockup engagement control operation and the lockup disengagement control operation. In the lockup disengagement control operation, when the brake is operated from the OFF state to the ON state during the coast traveling in the engagement state of the lockup clutch 20, an initial deceleration (=initial deceleration G) by the brake ON operation is sensed. The lockup release vehicle speed (=LU release vehicle speed) is set to be higher as the absolute value of the initial deceleration G is greater. When the vehicle speed VSP is sensed to be equal to or smaller than the set LU release vehicle speed in the middle of the brake deceleration scene by the brake ON operation, the control to disengage the lockup clutch 20 is performed.

A G step limit line map (FIG. 6) and a G inclination limit line map (FIG. 7) are previously set in the lockup control section 8a. The G step limit line map represents a limit line of the deceleration step (=G step) with respect to the initial deceleration G. The G inclination limit line map represents the limit line of the deceleration inclination (=G inclination) with respect to the initial deceleration G.

In this case, as shown in FIG. 4, the "Initial deceleration G" is a decreasing width of the vehicle longitudinal G generated by the brake ON operation immediately after time t1 when the brake is operated from the OFF state to the ON state at time t1. As shown in FIG. 4, the "G step" is a step width of the longitudinal G when the decreased deceleration G is returned in the acceleration direction when the lockup clutch 20 is disengaged at time t2. As shown in FIG. 4, the "G inclination" is an increasing inclination of the deceleration when the decreased deceleration G is returned in the acceleration direction when the lockup clutch 20 is disengaged at time t2.

Figure 6:
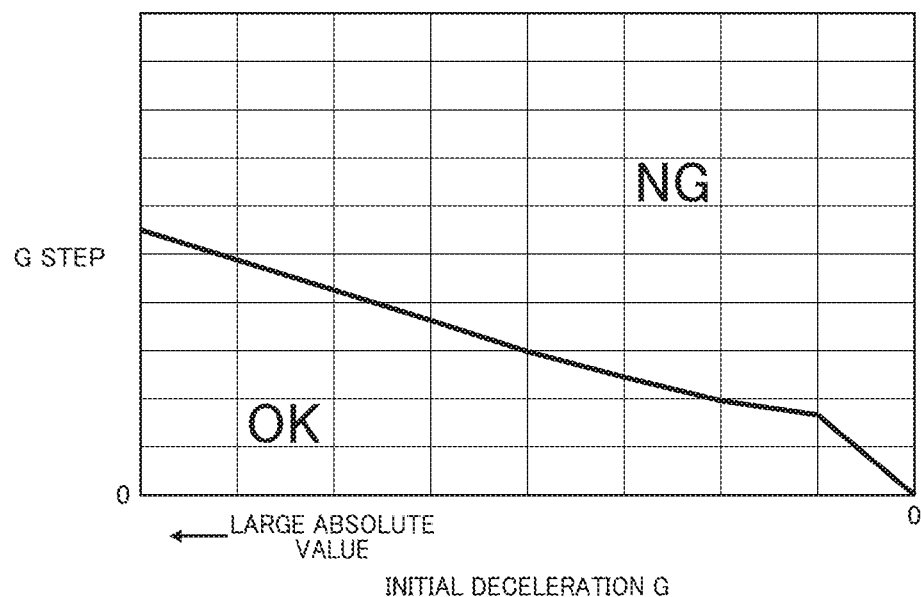
FIG. 6 is a G step limit line characteristic view showing a limit line between the vehicle behavior OK region and the vehicle behavior NG region when a horizontal axis is an initial deceleration G, and a vertical axis is the G step.

As shown in FIG. 6, in the G step limit line characteristic, a sensory evaluation of the G step is performed by a plurality of different patterns based on the pushed-out feeling with respect to the initial deceleration G when the lockup clutch 20 is disengaged. The sensory evaluation point (OK evaluation point) which is permitted as the variation of the vehicle behavior by the pushed-out feeling, and the sensory evaluation point (NG evaluation point) which is not permitted as the variation of the vehicle behavior by the pushed-out feeling are divided. A limit line of the OK evaluation point is set to the limit line (the point on the limit line is the OK evaluation point).

Figure 7:
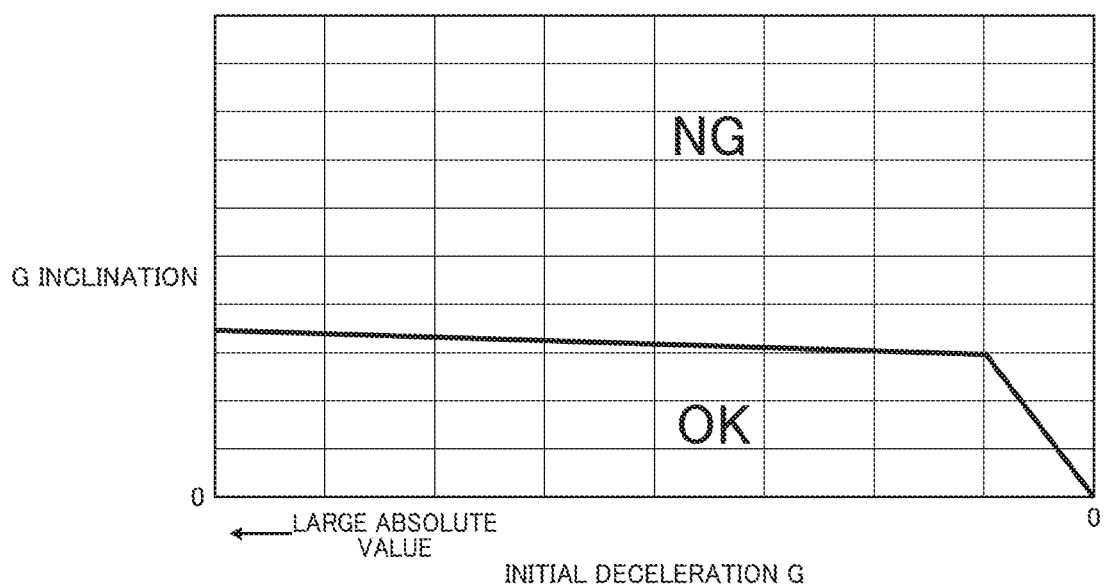
FIG. 7 is a G inclination limit line characteristic view showing a limit line between the vehicle behavior OK region and the vehicle behavior NG region when a horizontal axis is the initial deceleration G, and a vertical axis is the G Inclination.

As shown in FIG. 7, in the G inclination limit line characteristic, a sensory evaluation of the G inclination is performed by a plurality of different patterns based on the pushed-out feeling with respect to the initial deceleration G when the lockup clutch is disengaged. The sensory evaluation point (OK evaluation point) which is permitted as the variation of the vehicle behavior by the pushed-out feeling, and the sensory evaluation point (NG evaluation point) which is not permitted as the variation of the vehicle behavior by the pushed-out feeling are divided. A limit line of the OK evaluation point is set to the limit line (the point on the limit line is the OK evaluation point).

In the lockup disengagement control, for being the sensory evaluation which is permitted as the variation of the vehicle behavior by the pushed-out feeling, the G step and the G Inclination need to be permitted at the same time. FIG. 5 shows the OK region by both the G step and the G Inclination by dividing the large Initial deceleration, the middle initial deceleration, and the small initial deceleration. That is, the OK region (the dotted region) is widest when the initial deceleration is large. The OK region becomes narrower as the initial deceleration becomes toward the middle Initial deceleration (the broken line) and the small Initial deceleration (the solid line). In particular, the gap to narrow the OK region is wide in the G step relative to the G Inclination. It is understood that the influence on the variation of the vehicle behavior by the pushed-out feeling is larger in the G step than in the G inclination.

[Lockup Disengagement Control Operation Configuration]

FIG. 4 shows a flow of a lockup disengagement control operation performed in the lockup control section 8a of the CVT control unit 8 according to the first embodiment. Hereinafter, steps of FIG. 4 representing the lockup disengagement control operation configuration according to the first embodiment are explained. Besides, "LU" represents "lockup". "D/S" represents "drive shaft". "T/C" represents "torque converter".

At step S1, it is judged whether or not the lockup clutch 20 is in the engagement state. In case of YES (the LU engagement state), the process proceeds to step S2. In case of NO (the LU disengagement state), the process proceeds to step S17.

In this case, the "LU engagement state" represents the engagement state in which the lockup clutch 20 does not permit the generation of the rotation difference (differential rotation). That is, when the hydraulic pressure is applied to the lockup clutch 20, and when the clutch input rotation speed corresponds to the clutch output rotation speed, the "LU engagement state" is judged. Moreover, when the lockup clutch 20 is disengaged by the LU disengagement control operation at step S16, the "LU disengagement state" is judged.

Subsequently to the judgment of the LU engagement state at step S1, at step S2, it is judged whether or not the accelerator OFF is performed by the foot release operation from the accelerator pedal. In case of YES (the accelerator OFF), the process proceeds to step S3. In case of NO (the accelerator ON), the process returns to step S1.

In this case, it is judged whether or not the accelerator OFF (the coast traveling) is performed by sensing "the accelerator opening degree=0" from the accelerator opening degree sensor 86. Besides, in a case where an accelerator switch is provided, it may be judged by the switch signal.

Subsequently to the judgment of the accelerator OFF at step S2, at step S3, it is judged whether or not it is the brake ON from the brake OFF to the brake ON by the depression operation of the brake. In case of YES (from the brake OFF to the brake ON), the process proceeds to step S4. In case of NO (the brake OFF), the process returns to step S1.

In this case, it is judged whether or not it is switched from the brake OFF to the brake ON (the brake deceleration start) by sensing the switching of the switch signal from the brake signal 85. Besides, in a case where the brake stroke sensor is provided, it may be judged by the generation of the depression stroke amount which is equal to or greater than a predetermined amount.

Subsequently to the judgment from the brake OFF to the brake ON at step S3, at step S4, the Initial deceleration G by the brake ON operation is sensed. After the initial deceleration G is sensed, the process proceeds to step S5 and step S9.

In this case, in the detection of the initial deceleration G, the decrease of the vehicle longitudinal G generated by the brake ON operation is monitored from the sensor value from the longitudinal G sensor 87. In a case where the decrease of the vehicle longitudinal G is converged, and the constant vehicle longitudinal G is maintained during a predetermined time period, the maintained sensor value is obtained as the Initial deceleration G. Then, the process from step S5 to step S8 after the detection of the initial deceleration G are calculation processes of the LU release vehicle speed. The process from step S9 to step S12 are calculation processes of the LU hydraulic pressure Inclination. The both calculation processes are performed in parallel.

Subsequently to the detection of the initial deceleration G at step S4, at step S5, the G step is calculated from the Initial deceleration G by using the G step limit line characteristic. The process proceeds to step S6.

Figure 9:
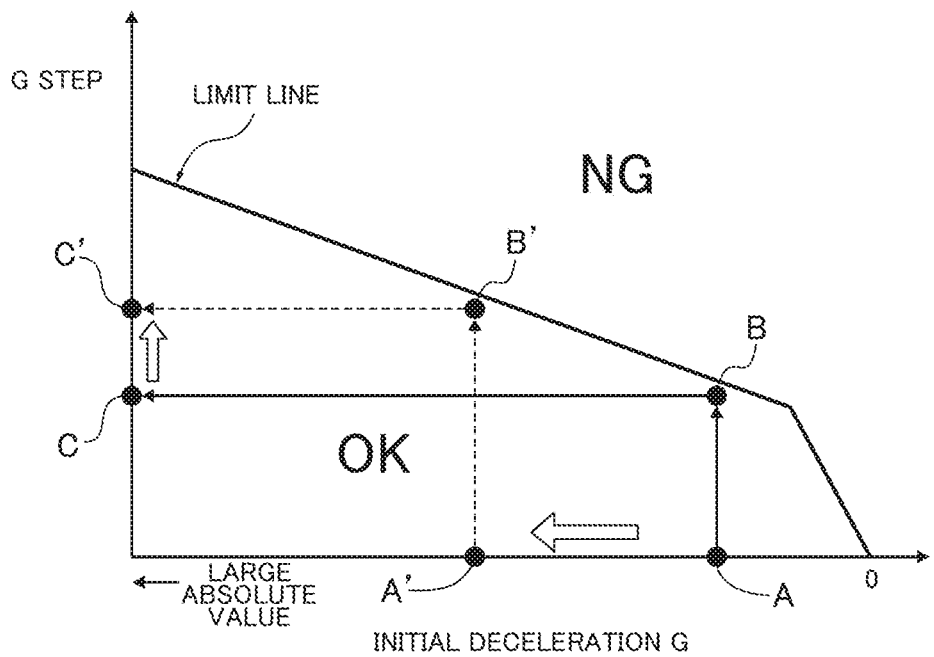
FIG. 9 is a G step calculation explanation view showing one example of a calculation of the G step from the initial deceleration G by using a G step limit line characteristic in the lockup disengagement control operation.

In this case, as shown in FIG. 9, the G step limit line characteristic is previously set by performing the sensory evaluation of the G step as shown in FIG. 6 based on the pushed-out feeling with respect to the initial deceleration G when the lockup clutch 20 is disengaged. For example, when the sensed initial deceleration G is a point A, a point B is determined on a line drawn from the point A in a vertical direction near the limit line in the ON region. A point C is determined as a point at which a line drawn from the point B in the horizontal direction crosses a G step axis. The point C Is the G step. Besides, the point B may be determined on the limit line. The point B may be a point which is apart from the limit line by a predetermined deviation width, that is, a position slightly inside the limit line.

Subsequently to the calculation of the initial deceleration G→the G step at step S5, at step S6, the D/S torque step is calculated from the G step calculated by using the vehicle sensitivity characteristic. The process proceeds to step S7.

Figure 10:
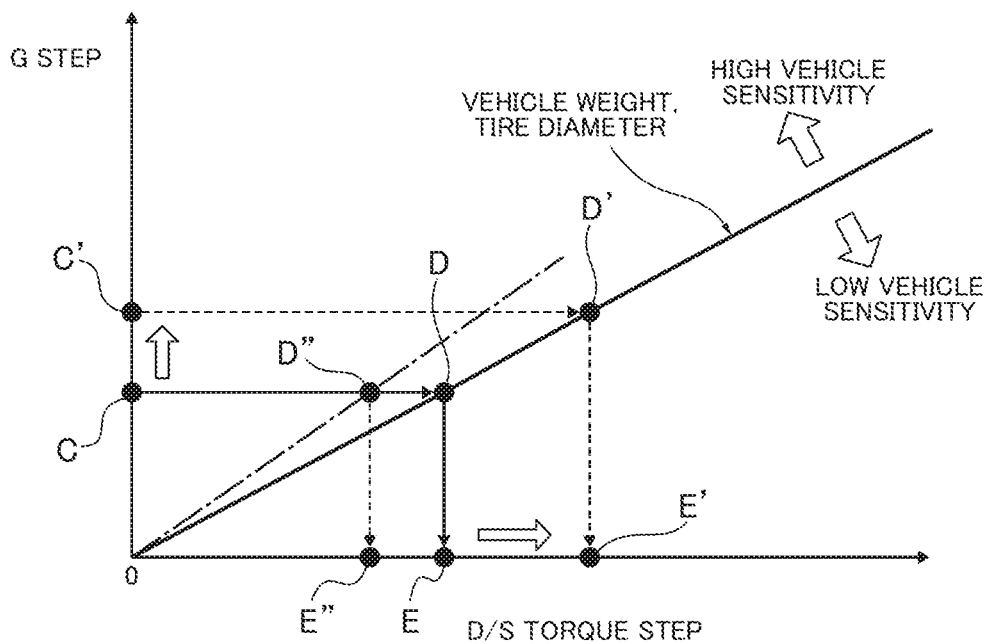
FIG. 10 is a D/S torque step calculation explanation view showing one example of a calculation of the D/S torque step from the G step by using a vehicle sensory characteristic in the lockup disengagement control operation.

In this case, as shown in FIG. 10, the vehicle sensitivity characteristic is previously set, as the vehicle sensitivity of the D/S torque step with respect to the G step, to a characteristic having an inclination angle of the magnitude of the sensitivity determined by the vehicle weight (the sensitivity is larger as the weight is smaller), and the tire diameter (the sensitivity is larger as the tire diameter is smaller). For example, when a point D is a position at which a line drawn in the horizontal direction from the point C which is the calculated G step crosses the vehicle sensitivity characteristic, a point E which is a position at which a line drawn in the vertical direction from the point D crosses the D/S torque step axis is the D/S torque step.

Subsequently to the calculation of the G step→the D/S torque step at step S6, at step S7, the LU torque step is calculated from the D/S torque step by using the transmission gear ratio characteristic. The process proceeds to step S8.

Figure 11:
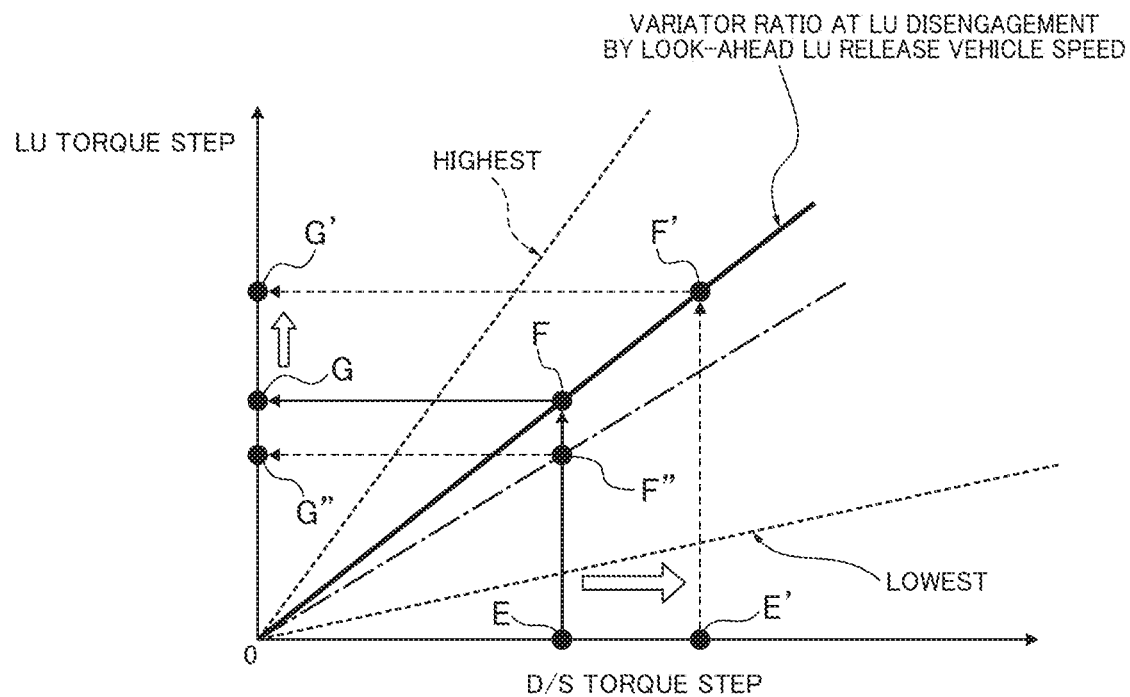
FIG. 11 is an LU torque step calculation explanation view showing one example of a calculation of the LU torque step from the D/S torque step by using a transmission gear ratio characteristic in the lockup disengagement control operation.

In this case, as shown in FIG. 11, the transmission gear ratio characteristic is set to a characteristic of the variator ratio (a fixed transmission gear ratio) at the LU disengagement by a look-ahead LU release vehicle speed before the calculation of the final LU release vehicle speed. Besides, the look-ahead LU release vehicle speed may be a predetermined vehicle speed fixed value, and may be a vehicle speed variable value according to the initial deceleration G. For example, when a point F is a position at which a line drawn in the vertical direction from the point E which is the calculated D/S torque step crosses the transmission gear ratio characteristic, a point G which is a position at which a line drawn in the horizontal direction from the point F crosses the LU torque step axis.

Subsequently to the calculation of the D/S torque step→the LU torque step at step S7, at step S8, the LU release vehicle speed is calculated from the LU torque (the engine torque) by using the coast torque characteristic. The process proceeds to step S13.

Figure 12:
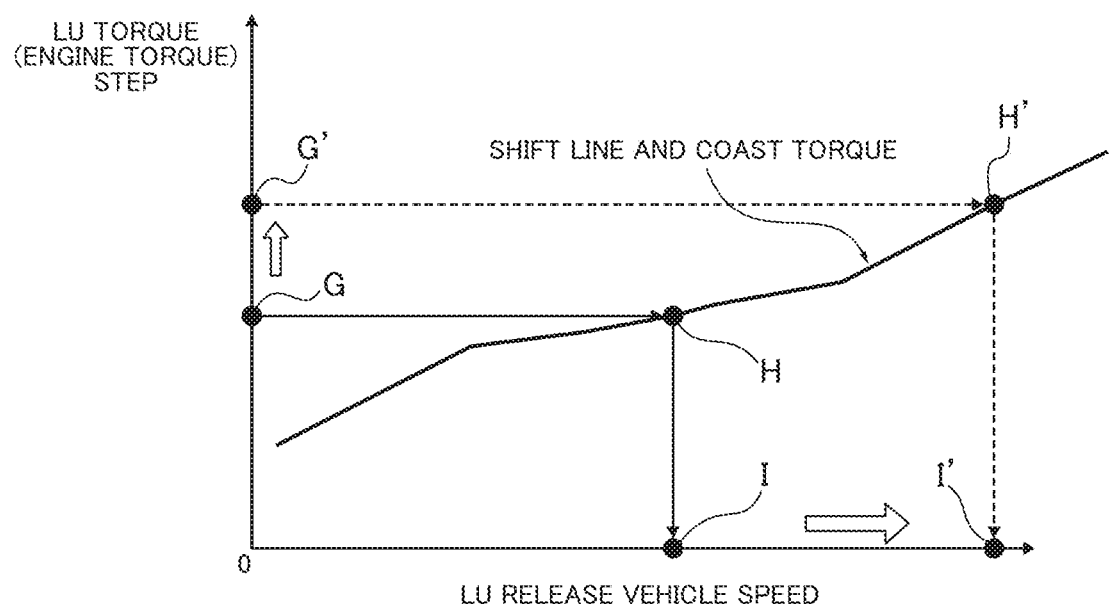
FIG. 12 is an LU release vehicle speed calculation explanation view showing one example of a calculation of the LU release vehicle speed from the LU torque (the engine torque) by using a shift line and a coast torque characteristic in the lockup disengagement control operation.

In this case, as shown in FIG. 12, the coast torque characteristic is previously set by a relationship between the coast torque and a coast shift line (the vehicle speed) at the coast traveling by the accelerator OFF. For example, when a point H is a position at which a line drawn in the horizontal direction from the point G which is the calculated LU torque step crosses the coast torque characteristic, a point I which is a position at which a line drawn in the vertical direction from the point H crosses the LU release vehicle speed axis is the LU release vehicle speed.

Subsequently to the detection of the initial deceleration G at step S4, at step S9, the G inclination is calculated from the initial deceleration G by using the G inclination limit line characteristic. The process proceeds to step S10.

Figure 13:
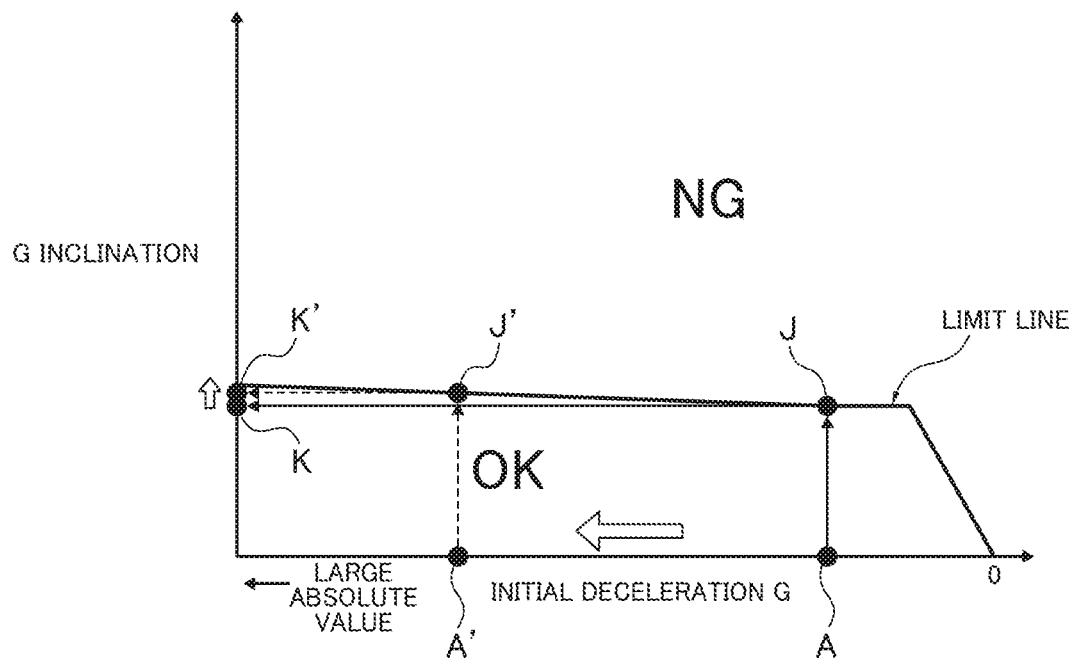
FIG. 13 is a G inclination calculation explanation view showing one example of a calculation of the G inclination from the initial deceleration G by using a G inclination limit line characteristic in the lockup disengagement control operation.

In this case, as shown in FIG. 13, the G inclination limit line characteristic Is previously set by performing the sensory evaluation of the G inclination as shown in FIG. 7 based on the pushed-out feeling with respect to the initial deceleration G when the lockup clutch 20 is disengaged. For example, when the sensed initial deceleration G is a point A, a point J is determined on a line drawn in the vertical direction from the point A near the limit line in the OK region. A point K which is a position at which a line drawn in the horizontal direction from the point J crosses the G inclination axis is the G inclination. Besides, the point J may be determined on the limit line. The point J may be a position apart from the limit line by a predetermined deviation width, that is, a position slightly inside the limit line.

Subsequently to the calculation of the initial deceleration G→the G inclination at step S9, at step S10, the D/S torque inclination is calculated from the calculated G inclination by using the vehicle sensitivity characteristic. The process proceeds to step S11.

Figure 14:
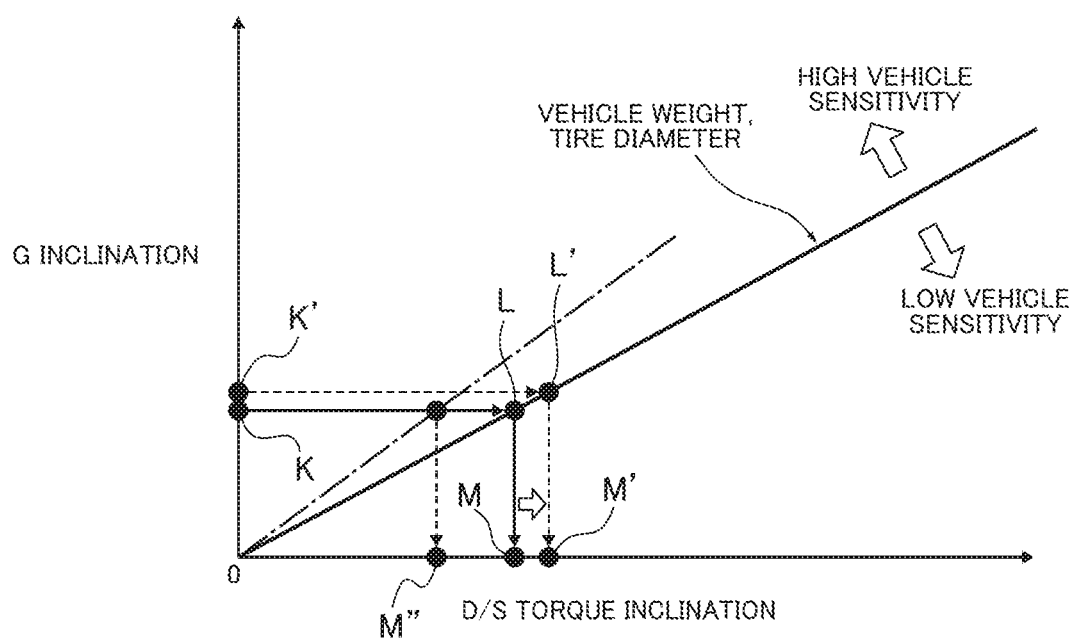
FIG. 14 is a D/S torque inclination calculation explanation view showing one example of a calculation of the D/S torque inclination from the G inclination by using the vehicle sensory characteristic in the lockup disengagement control operation.

In this case, as shown in FIG. 14, the vehicle sensitivity characteristic is previously set, as the vehicle sensitivity of the D/S torque inclination with respect to the G inclination, to a characteristic having an inclination angle of a magnitude of the sensitivity determined by the vehicle weight of the engine vehicle (the sensitivity is larger as the vehicle weight is smaller), and the tire diameter (the sensitivity is larger as the tire diameter is smaller). For example, a point L is a position at which a line drawn in the horizontal direction from the point K which is the calculated G inclination crosses the vehicle sensitivity characteristic, a point M which is a position at which a line drawn in the vertical direction from the point L crosses the D/S torque inclination axis is the D/S torque inclination.

Subsequently to the calculation of the G inclination→the D/S torque inclination at step S10, at step S11, the LU torque inclination Is calculated from the D/S torque inclination by using the transmission gear ratio characteristic. The process proceeds to step S12.

Figure 15:
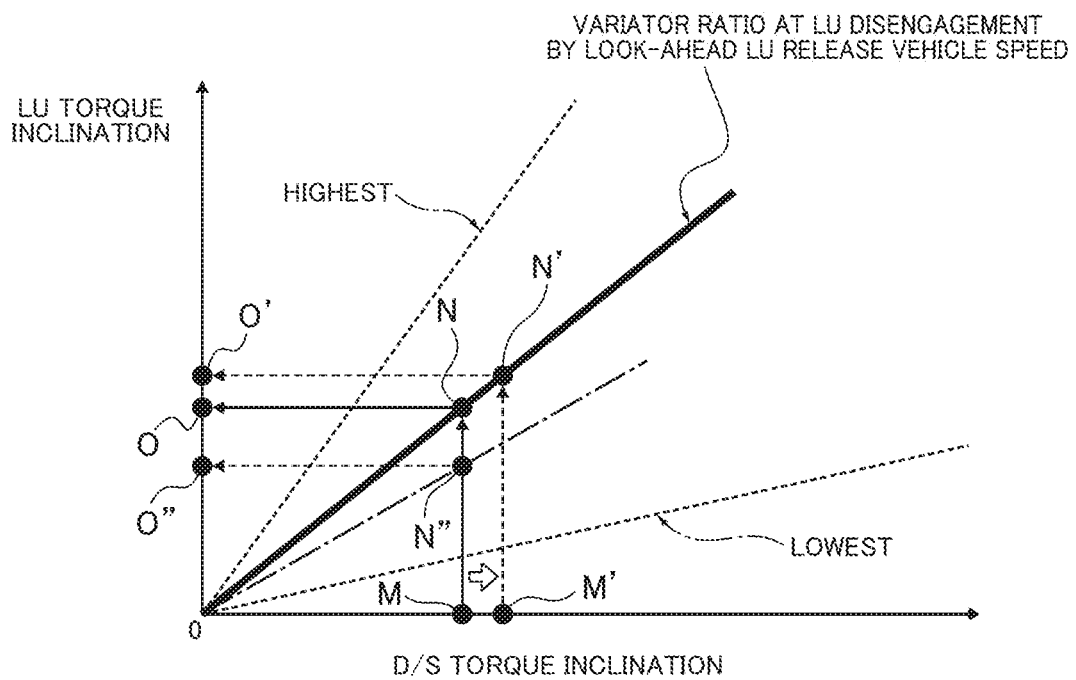
FIG. 15 is an LU torque inclination calculation explanation view showing one example of a calculation of the LU torque Inclination from the D/S torque inclination by using the transmission gear ratio characteristic in the lockup disengagement control operation.

In this case, as shown in FIG. 15, the transmission gear ratio characteristic is set to a characteristic of the variator ratio (the fixed transmission gear ratio) at the LU disengagement by the look-ahead LU release vehicle speed before the calculation of the final LU release vehicle speed. Besides, the look-ahead LU release vehicle speed may be the previously set vehicle speed fixed value, and a vehicle speed variable value according to the magnitude of the initial deceleration G. For example, when a point N is a position at which a line drawn in the vertical direction from the point M which is the calculated D/S torque inclination crosses the transmission gear ratio characteristic, a point O which is a position at which a line drawn in the horizontal direction from the point N crosses the LU torque inclination axis is the LU torque inclination.

Subsequently to the calculation of the D/S torque inclination→the LU torque inclination at step S11, at step S12, the LU hydraulic pressure inclination is calculated from the LU torque inclination by using a T/C differential pressure capacity characteristic.

Figure 16:
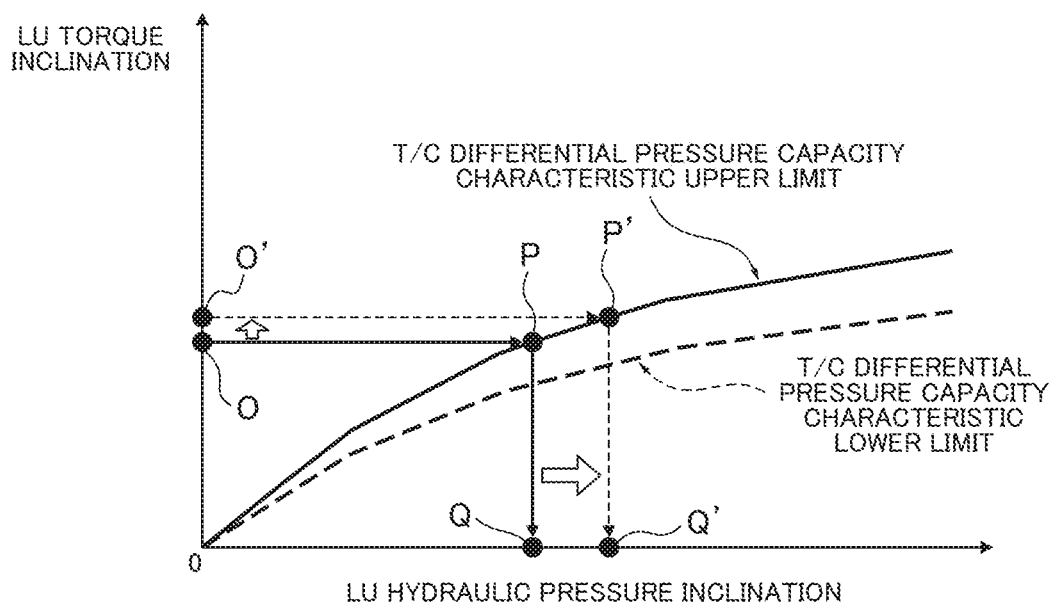
FIG. 16 is a LU hydraulic pressure inclination calculation explanation view showing one example of a calculation of the LU torque inclination from the LU torque inclination by using a T/C differential pressure capacity characteristic in the lockup disengagement control operation.

In this case, as shown in FIG. 16, the T/C differential pressure capacity characteristic is previously set as the T/C differential pressure characteristic upper limit by a relationship between the LU hydraulic pressure inclination and the LU torque inclination of the lockup clutch 20 controlled by the differential pressure capacity of the torque converter 2. For example, in a case where a point P is a position at which a line drawn in the horizontal direction from a point O which is the calculated LU torque inclination crosses the coast torque characteristic, a point Q which is a position at which a line drawn in the vertical direction from the point P crosses the LU hydraulic pressure inclination axis is the LU hydraulic pressure inclination.

Subsequently to the calculation of the LU release vehicle speed at step S8, and the calculation of the LU hydraulic pressure inclination at step S12, at step S13, it is judged whether or not the an engine speed estimate value Neoff is smaller than a lower limit engine speed Nelow. In case of YES (the engine speed estimate value Neoff<the lower limit engine speed Nelow), the process proceeds to step S14. In case of NO (the engine speed estimate value Neoff≥the lower limit engine speed Nelow), the process proceeds to step S15.

In this case, "the engine rotation speed estimate value Neoff at the disengagement completion" is the engine speed at the LU disengagement completion when the execution of the disengagement control of the lockup clutch 20 is estimated in accordance with the LU release vehicle speed and the LU hydraulic pressure inclination which are calculated at steps S8 and S12. "The lower limit engine speed Nelow" is a decrease restriction rotation speed of the engine speed by which the engine is not brought to the engine stall.

Subsequently to the judgment of the engine speed estimation value Neoff<the lower limit engine speed Nelow at step S13, at step S14, the LU release vehicle speed calculated at step S8 is rewritten to a newly calculated LU release vehicle speed. The process proceeds to step S15.

In this case, "the newly calculated LU release vehicle speed" is the LU release vehicle speed obtained by correcting the LU release vehicle speed calculated at step S8 to the high vehicle speed side to advance the LU release start, so that the engine speed estimate value at the LU disengagement completion becomes the lower limit engine speed. In particular, the release start timing (the new LU release vehicle speed) is determined by inverting the release inclination (the LU hydraulic pressure inclination) from the disengagement completion timing.

Subsequently to the judgment of the engine speed estimate value Neoff 2 the lower limit engine speed Nelow at step S13, or the rewriting to the LU release vehicle speed at step S14, at step S15, it is judged whether or not the vehicle speed VSP sensed by the vehicle speed sensor 81 reaches the LU release vehicle speed. In case of YES (the vehicle speed reaches the LU release vehicle speed), the process proceeds to step S16. In case of NO (the vehicle speed does not reach the LU release vehicle speed), the process repeats the judgment of step S15.

Subsequently to the judgment that the vehicle speed reaches the LU release vehicle speed at step S15, at step S16, the lockup clutch disengagement control is performed to disengage the lockup clutch 20 in the engagement state by the calculated LU hydraulic pressure inclination. The process proceeds to the return.

Subsequently to the judgment of the LU disengagement state at step S1, at step S17, the lockup engagement control is performed to engage the lockup clutch 20 in the disengagement state. The process proceeds to the return.

In this case, "the lockup engagement control" may be a control to start the engagement of the lockup clutch 20 when the vehicle speed reaches a previously set LU engagement vehicle speed. "The lockup engagement control" may be an engagement control of the lockup clutch 20 by setting other conditions.

Next, operations are explained.

The operations of the first embodiment are explained with reference to "problems of lockup disengagement control, and problem solving method", "lockup disengagement control process operation", "LU release vehicle speed setting operation by G step", "LU hydraulic pressure inclination setting operation by G inclination", "LU release vehicle speed correction operation by vehicle sensitivity and transmission gear ratio", and "LU hydraulic pressure inclination correction operation by vehicle sensitivity and transmission gear ratio".

[Problems of Lockup Disengagement Control, and Problem Solving Method]

In the conventional lockup disengagement control, the lockup release vehicle speeds each of which is a start point of the lockup disengagement Is set for respective vehicle types by using various parameters such as the accelerator opening degree, the vehicle speed, the rotation, the torque, the range information, and the shift stage. The disengagement of the lockup clutch is started when the vehicle speed is decreased to the lockup release vehicle speed in the brake deceleration scene and so on.

However, in the conventional lockup disengagement control, the start point of the lockup disengagement is judged by the various parameters. Accordingly, in a case where the lockup release vehicle speed is set, the checking man-hour is required, and the setting error is frequently generated. That is, the checking of the real device is needed under the various parameter conditions. Moreover, one lockup release vehicle speed is set as a substitute with respect to the sensory evaluation of the variation of the vehicle behavior which is varied in accordance with the condition. Consequently, the sensory evaluation of the variation of the vehicle behavior is checked while tuning. The man-hour of the experiment becomes enormous.

(A) For solving the above-described problems, the inventors and so on of the present application thinks to need to provide the lockup release vehicle speed by the variable value without providing the lockup release vehicle speed by the one fixed value. Moreover, the inventors recognized that the magnitude of the initial deceleration G by the brake ON operation largely influence on the sensory evaluation of the variation of the vehicle behavior at the setting of the lockup release vehicle speed.

(B) That is, "the pulled-in feeling" by the decrease of the longitudinal G is larger as the absolute value of the Initial deceleration G by the brake ON operation is larger. On the other hand, the magnitude of "the pushed-out feeling" by the LU disengagement is represented by the magnitude of "the G step" which is the variation width of the longitudinal G according to the LU disengagement, and the magnitude of "the G inclination" which is the variation inclination of the longitudinal G. In the relationship between the initial deceleration G and the sensory evaluation of the variation of the vehicle behavior, when the absolute value of the initial deceleration G is large, "the pulled-in feeling" is large. Accordingly, even when "the pushed-out feeling" by the LU disengagement (the large G step, and the large G Inclination) is large, in the sensory evaluation, this is permitted. Conversely, in a case where the absolute value of the initial deceleration G is small, "the pulled-in feeling" is small. Accordingly, the only small "pushed-out feeling (the small G step, the small G inclination)" by the LU disengagement is permitted as the sensory evaluation (cf. FIG. 5).

(C) Accordingly, when the brake Is operated from the brake OFF to the brake ON at the traveling in the engagement state of the lockup clutch 20, the initial deceleration G by the brake ON operation is sensed. The LU release vehicle speed Is set to be higher as the absolute value of the initial deceleration G is larger to correspond to the sensory evaluation of the variation of the vehicle behavior. With this, at the brake deceleration scene, it is possible to suppress the variation of the vehicle behavior generated by the disengagement of the lockup clutch 20, to a level equal to or smaller than a permission level of the occupant.

(D) Moreover, in case of the same initial deceleration G, the same LU release vehicle speed is set. However, even at the same LU release vehicle speed, the sensory evaluation permitted by the occupant is influenced by the shock sensitivity (=the vehicle sensitivity) by the variation of the longitudinal G determined by the vehicle specification. Accordingly, by using the vehicle weight and the tire diameter which influence on the vehicle sensitivity, the LU release vehicle speed calculated by the initial deceleration G is corrected to the low vehicle speed side as the vehicle sensitivity is higher. With this, it is possible to suppress the variation of the vehicle behavior to the level equal to or smaller than the permission level of the occupant, irrespective of the high or low vehicle sensitivity.

(E) Furthermore, in case of the same initial deceleration G, the same LU release vehicle speed is set. However, even at the same LU release vehicle speed, the transmission gear ratio of the variator 4 at the LU disengagement influences on the sensory evaluation permitted by the occupant. Accordingly, the transmission gear ratio of the variator 4 at the LU disengagement is estimated. The LU disengagement vehicle speed calculated by the initial deceleration G is corrected to the low vehicle speed side as the estimated transmission gear ratio is the lower transmission gear ratio. With this, it is possible to suppress the variation of the vehicle behavior to the level equal to or smaller than the permission level of the occupant, irrespective of the transmission gear ratio of the variator 4 at the LU disengagement.

(F) "The pushed-out feeling" at the LU disengagement is represented by "the G step" having a correspondence relation to "the LU release vehicle speed", and "the G inclination" having a correspondence relation to "the LU hydraulic pressure inclination". Accordingly, "the LU release vehicle speed" is calculated by using a combination of "the initial deceleration G" and "the G step". "The LU hydraulic pressure inclination" is calculated by using a combination of "the initial deceleration G" and "the G inclination". With this, at the LU disengagement, it is possible to attain the "pushed-out feeling" intended with respect to the generation of the initial deceleration G.

[Lockup Disengagement Control Process Operation]

Figure 8:
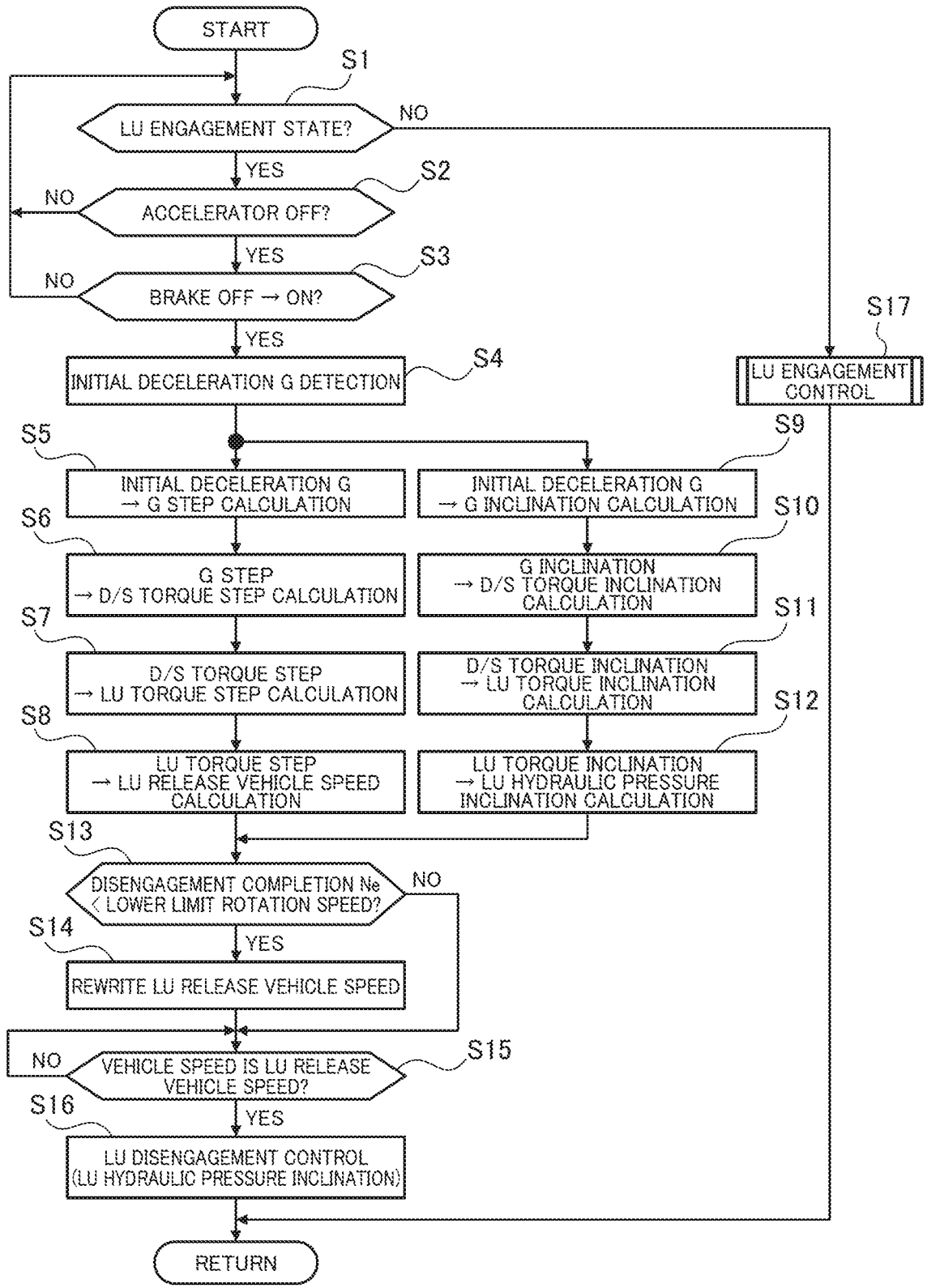
FIG. 8 is a flowchart showing a flow of a lockup release control operation performed in a lockup control section of a CVT control unit according to the first embodiment.

Hereinafter, a lockup disengagement control process operation to embody the method for solving the above-described problems is explained with reference to a flowchart shown in FIG. 8.

When the lockup clutch 20 is in the disengagement state, and when the vehicle is decelerated by the brake ON operation in the coast traveling state by the foot release, the process proceeds along step S1→step S2→step S3→step S4. At step S4, the initial deceleration G by the brake ON operation is sensed. When the initial deceleration G is sensed at step S4, subsequently to the detection of the initial deceleration G, the calculation operation of the LU release vehicle speed at steps S5 to S9, and the calculation operation of the LU hydraulic pressure inclination at step S9 to S12 are performed.

The calculation operation of the LU release vehicle speed is explained. Subsequently to the detection of the Initial deceleration G at step S4, at step S5, the G step is calculated from the initial deceleration G by using the G step limit line characteristic. Subsequently to the calculation of the initial deceleration G→the G step at step S5, at next step S6, the D/S torque step is calculated from the G step calculated by using the vehicle sensitivity characteristic. Subsequently to the calculation of the G step→the D/S torque step at step S6, at next step S7, the LU torque step is calculated from the D/S torque step by using the transmission gear ratio characteristic. Subsequently to the calculation of the D/S torque step→the LU torque step at step S7, at next step S8, the LU release vehicle speed is calculated from the LU torque (the engine torque) step by using the coast torque characteristic.

The calculation operation of the LU hydraulic pressure inclination is explained. Subsequently to the detection of the initial deceleration G at step S4, at step S9, the G inclination is calculated from the initial deceleration G by using the G inclination limit line characteristic. Subsequently to the calculation of the initial deceleration G 25→the G inclination at step S9, at next step S10, the D/S torque inclination Is calculated from the G Inclination calculated by using the vehicle sensitivity characteristic. Subsequently to the calculation of the G inclination→the D/S torque inclination at step S10, at next step S11, the LU torque inclination is calculated from the D/S torque inclination by using the transmission gear ratio characteristic. Subsequently to the calculation of the D/S torque inclination→the LU torque inclination at step S11, at next step S12, the LU hydraulic inclination is calculated from the LU torque inclination by using the T/C differential pressure capacity characteristic.

After the calculation operation of the LU release vehicle speed and the calculation operation of the LU hydraulic pressure inclination are finished, the process proceeds from step S8 and step S12 to step S13. At step S13, it is judged that the engine speed estimation value Neoff at the completion of the disengagement of the lockup clutch 20 is lower than the lower limit engine speed Nelow. When the engine speed estimation value Neoff<the lower limit engine speed Nelow is judged at step S13, the process proceeds to step S14. At step S14, the LU release vehicle speed calculated at step S8 is rewritten to a newly calculated LU release vehicle speed. That is, in a case where the engine stall may be generated by using the LU release vehicle speed calculated at step S8, the LU release vehicle speed calculated at step S8 is corrected to the high vehicle speed side so that the engine speed estimate value at the LU disengagement completion becomes the lower limit engine speed.

When the engine speed estimation value Neoff 2 the lower limit engine speed Nelow is judged at step S13, or when the LU release vehicle speed is rewritten at step S14, the process proceeds to step S15. At step S15, it Is judged whether or not the vehicle speed VSP sensed by the vehicle speed sensor 81 reaches the LU release vehicle speed. When the vehicle speed does not reach the LU release vehicle speed, the process repeats the judgment of step S15. When the vehicle speed reaches the LU release vehicle speed, the process proceeds from step S15 to step S16. At step S16, the lockup clutch disengagement control is performed to disengage the lockup clutch 20 in the engagement state by the calculated LU hydraulic pressure inclination.

On the other hand, when the lockup clutch 20 is in the disengagement state, the process repeats the flow of step S1→step S17→the return. Subsequently to the judgment of the LU disengagement at step S1, at step S17, the lockup engagement control Is performed to engage the lockup clutch 20 in the disengagement state. In the lockup engagement control, for example, when the vehicle speed reaches the previously set LU engagement vehicle speed, the control to start the engagement of the lockup clutch 20 is performed.

[LU Release Vehicle Speed Setting Operation by G Step]

The LU release vehicle speed setting operation by the G step when the absolute value of the initial deceleration G Is increased in the brake deceleration scene is explained with reference to FIG. 9 to FIG. 12.

In the brake deceleration scene in which the absolute value of the initial deceleration G by the brake operation is small, the sensed initial deceleration G is represented by the point A shown in FIG. 9. When the absolute value of this initial deceleration G is small, the point B is determined on the line drawn in the vertical direction from the point A near the limit line in the OK region. The point C is determined as a point at which a line drawn from the point B in the horizontal direction crosses the G step axis. The point C is the G step.

On the other hand, in the brake deceleration scene in which the absolute value of the initial deceleration G is large, the sensed initial deceleration G is represented by a point A' as shown in FIG. 9. When the absolute value of this initial deceleration G is large, a point B' is determined on the line drawn in the vertical direction from the point A' near the limit line in the OK region. A point C' is determined as a point at which a line drawn from the point B' in the horizontal direction crosses the G step axis. The point C is the G step. That is, in the brake deceleration scene, when the absolute value of the initial deceleration G is increased to shift from the point A to the point A', the G step is shifted from the point C to the point C', so as to increase the permitted G step.

Accordingly, in a case where the D/S torque step is calculated from the G step by using the vehicle sensitivity characteristic, as shown in FIG. 10, the D/S torque step is shifted from the point E to the point E' to increase the permitted D/S torque step. Moreover, in a case where the LU torque step is calculated from the D/S torque step by using the transmission gear ratio characteristic, as shown in FIG. 11, the LU torque step is shifted from the point G to the point G' to increase the permitted LU torque step. Furthermore, in a case where the LU release vehicle speed is calculated from the LU torque step by using the coast torque characteristic, as shown in FIG. 12, the LU release vehicle speed is shifted from the point I to the point I'. That is, in the brake deceleration scene, the LU release vehicle speed when the absolute value of the initial deceleration G is large is higher than the LU release vehicle speed when the absolute value of the Initial deceleration G is small.

Consequently, in the brake deceleration scene, it is possible to suppress the G step generated by the disengagement of the lockup clutch 20, to a level equal to or smaller than the permission level which exists in the OK region as the sensory evaluation of the occupant, as shown in FIG. 9.

[LU Hydraulic Pressure Inclination Setting Operation by G Inclination]

The LU release vehicle speed setting operation by the G step when the absolute value of the initial deceleration G is increased in the brake deceleration scene is explained with reference to FIG. 13 to FIG. 16.

In the brake deceleration scene in which the absolute value of the initial deceleration G by the brake operation is small, the sensed initial deceleration G is represented by the point A shown in FIG. 13. When the absolute value of this initial deceleration G is small, the point J is determined on the line drawn in the vertical direction from the point A near the limit line in the OK region. The point K is determined as a point at which a line drawn from the point J in the horizontal direction crosses the G inclination axis. The point K is the G inclination.

On the other hand, in the brake deceleration scene in which the absolute value of the initial deceleration G Is large, the sensed initial deceleration G is represented by a point A' as shown in FIG. 13. When the absolute value of this initial deceleration G is large, a point J' is determined on the line drawn in the vertical direction from the point A' near the limit line in the OK region. A point K' is determined as a point at which a line drawn from the point J' in the horizontal direction crosses the G inclination axis. The point K' Is the G inclination. That is, in the brake deceleration scene, when the absolute value of the initial deceleration G is increased to shift from the point A to the point A', the G inclination is shifted from the point K to the point K', so as to increase the permitted G inclination. Besides, the variation width of the G inclination with respect to the variation width of the absolute value of the initial deceleration G becomes smaller than the variation width of the G step.

Accordingly, in a case where the D/S torque inclination is calculated from the G inclination by using the vehicle sensitivity characteristic, as shown in FIG. 14, the D/S torque inclination is shifted from the point M to the point M' to increase the permitted D/S torque inclination. Moreover, in a case where the LU torque inclination is calculated from the D/S torque inclination by using the transmission gear ratio characteristic, as shown in FIG. 15, the LU torque inclination is shifted from the point O to the point O' to increase the permitted LU torque inclination. Furthermore, in a case where the LU hydraulic pressure inclination is calculated from the LU torque inclination by using the coast torque characteristic, as shown in FIG. 16, the LU hydraulic pressure inclination is shifted from the point Q to the point Q'. That is, in the brake deceleration scene, the LU hydraulic pressure inclination when the absolute value of the initial deceleration G is large is higher than the LU hydraulic pressure inclination when the absolute value of the initial deceleration G is small.

Consequently, in the brake deceleration scene, it is possible to suppress the G inclination generated by the disengagement of the lockup clutch 20, to a level equal to or smaller than the permission level which exists in the OK region as the sensory evaluation of the occupant, as shown in FIG. 13.

[LU Release Vehicle Speed Correction Operation by Vehicle Sensitivity and Transmission Gear Ratio]

The LU release vehicle speed correction operation by the vehicle sensitivity is explained with respect to FIG. 10. Firstly, the G step with respect to the initial deceleration G is the point C. The vehicle sensitivity characteristic is a solid line characteristic of FIG. 10. In this case, a point D is represented by a position at which the line drawn in the horizontal direction from the point C which is the G step crosses the vehicle sensitivity characteristic. The point E which is a position at which the line drawn in the vertical direction from the point D crosses the D/S torque step axis is the D/S torque step.

Next, the G step with respect to the initial deceleration G is the point C. The vehicle sensitivity characteristic is shifted to the high sensitivity side to be a chain line characteristic of FIG. 10. In this case, a point D" is represented by a position at which the line drawn in the horizontal direction from the point C which is the G step crosses the vehicle sensitivity characteristic. A point E" which is a position at which the line drawn in the vertical direction from the point D" crosses the D/S torque step axis is the D/S torque step. That is, the D/S torque step becomes smaller than the D/S torque step at the point E. The LU release vehicle speed calculated by the initial deceleration G is corrected to the low vehicle speed side when the vehicle sensitivity becomes higher even when the initial deceleration G is the same.

Consequently, in the brake deceleration scene, it is possible to suppress the G step generated by the disengagement of the lockup clutch 20, to a level equal to or smaller than the permission level which exists in the OK region as the sensory evaluation of the occupant, as shown in FIG. 9, irrespective of the high or low vehicle sensitivity.

Next, the LU release vehicle speed correction operation by the transmission gear ratio is explained with respect to FIG. 11.

Firstly, the D/S torque step with respect to the initial deceleration G is the point E. The transmission gear ratio characteristic is a solid line characteristic of FIG. 11. In this case, a point F is represented by a position at which the line drawn in the vertical direction from the point E which is the D/S torque step crosses the transmission gear ratio characteristic. A point G which is a position at which the line drawn in the horizontal direction from the point F crosses the LU torque step axis is the LU torque step.

Next, the D/S torque step with respect to the initial deceleration G is the point E. The transmission gear ratio characteristic is shifted to the lower transmission gear ratio side relative to the solid line characteristic to be a chain line characteristic of FIG. 11. In this case, a point F" is represented by a position at which the line drawn in the vertical direction from the point E which is the D/S torque step crosses the transmission gear ratio characteristic. A point G" which is a position at which the line drawn in the horizontal direction from the point F" crosses the LU torque step axis is the LU torque step. That is, the LU torque step becomes smaller than the LU torque step at the point G. The LU release vehicle speed calculated by the initial deceleration G is corrected to the low vehicle speed side when the transmission gear ratio becomes the lower side even when the initial deceleration G is the same.

Consequently, in the brake deceleration scene, it is possible to suppress the G step generated by the disengagement of the lockup clutch 20, to a level equal to or smaller than the permission level which exists in the OK region as the sensory evaluation of the occupant, as shown in FIG. 9, irrespective of the transmission gear ratio of the variator 4 at the LU disengagement.

[LU Hydraulic Pressure Inclination Correction Operation by Vehicle Sensitivity and Transmission Gear Ratio]

The LU hydraulic pressure inclination correction operation by the vehicle sensitivity is explained with respect to FIG. 14. Firstly, the G Inclination with respect to the initial deceleration G is the point K. The vehicle sensitivity characteristic is a solid line characteristic of FIG. 14. In this case, a point L is represented by a position at which the line drawn in the horizontal direction from the point K which is the G Inclination crosses the vehicle sensitivity characteristic. A point M which is a position at which the line drawn in the vertical direction from the point L crosses the D/S torque step axis is the D/S torque step.

Next, the G step with respect to the initial deceleration G is the point K. The vehicle sensitivity characteristic is shifted to the high sensitivity side to be a chain line characteristic of FIG. 14. In this case, a point L" is represented by a position at which the line drawn in the horizontal direction from the point K which is the G inclination crosses the vehicle sensitivity characteristic. A point M" which is a position at which the line drawn in the vertical direction from the point L" crosses the D/S torque inclination axis is the D/S torque inclination. That is, the D/S torque inclination becomes smaller than the D/S torque inclination at the point M. The LU release vehicle speed calculated by the initial deceleration G is corrected to the lower vehicle speed side when the vehicle sensitivity becomes higher even when the initial deceleration G is the same.

Consequently, in the brake deceleration scene, it is possible to suppress the G inclination generated by the disengagement of the lockup clutch 20, to a level equal to or smaller than the permission level which exists in the OK region as the sensory evaluation of the occupant, as shown in FIG. 13, irrespective of the high or low vehicle sensitivity.

Next, the LU hydraulic pressure inclination correction operation by the transmission gear ratio is explained with respect to FIG. 15.

Firstly, the D/S torque inclination with respect to the initial deceleration G is the point M. The transmission gear ratio characteristic is a solid line characteristic of FIG. 15. In this case, a point N is represented by a position at which the line drawn in the vertical direction from the point M which is the D/S torque inclination crosses the transmission gear ratio characteristic. A point O which is a position at which the line drawn in the horizontal direction from the point N crosses the LU torque inclination axis is the LU inclination step.

Next, the D/S torque inclination with respect to the initial deceleration G is the point M. The transmission gear ratio characteristic is shifted to the lower transmission gear ratio side relative to the solid line characteristic to be a chain line characteristic of FIG. 15. In this case, a point N" is represented by a position at which the line drawn in the vertical direction from the point M which is the D/S torque inclination crosses the transmission gear ratio characteristic. A point O" which is a position at which the line drawn in the horizontal direction from the point N" crosses the LU torque inclination axis is the LU torque inclination. That is, the LU torque inclination becomes smaller than the LU torque inclination at the point O. The LU hydraulic pressure Inclination calculated by the initial deceleration G is corrected to a side on which the inclination becomes small (a side on which the inclination becomes gentle) when the transmission gear ratio becomes the lower side even when the initial deceleration G is the same.

Consequently, in the brake deceleration scene, it is possible to suppress the G Inclination generated by the disengagement of the lockup clutch 20, to a level equal to or smaller than the permission level which exists in the OK region as the sensory evaluation of the occupant, as shown in FIG. 13, irrespective of the transmission gear ratio of the variator 4 at the LU disengagement.

Next, effects are explained.

Below-described effects can be obtained in the lockup disengagement control device of the belt-type continuously variable transmission CVT according to the first embodiment.

(1) A lockup disengagement control device for an automatic transmission (belt-type continuously variable transmission CVT) including a torque converter 2 which Is disposed between a traveling driving source (engine 1) and a shift mechanism (variator 4), and which includes a lockup clutch 20 configured to be engaged to directly connect an torque converter input shaft and a torque converter output shaft, and a lockup control section 8a configured to perform a lockup engagement control and a lockup disengagement control of the lockup clutch 20, the lockup disengagement control device including:

when a brake Is operated from a brake OFF to a brake ON during a coast traveling in an engagement state of the lockup clutch 20, the lockup control section 8a being configured to sense an initial deceleration G by the brake ON operation, and to set a lockup release vehicle speed (LU release vehicle speed) to be higher as an absolute value of the initial deceleration G is greater, when a vehicle speed is sensed to be equal to or smaller than the set lockup release vehicle speed (LU release vehicle speed) in a middle of a brake deceleration scene by the brake ON operation, the lockup control section being configured to disengage the lockup clutch 20.

Accordingly, at the brake deceleration scene, it is possible to suppress the variation of the vehicle behavior generated by the disengagement of the lockup clutch 20, to a level equal to or smaller than a permission level of the occupant.

(2) The lockup control section 8a is configured to perform a sensory evaluation of a deceleration step (G step) based on a pushed-out feeling with respect to an initial deceleration G when the lockup clutch 20 is disengaged, and thereby to previously set a limit line by a permitted sensory evaluation point; and the lockup control section is configured to set the lockup release vehicle speed (LU release vehicle speed) to a higher value as the permitted deceleration step (G step) determined based on the limit line with respect to the absolute value of the Initial deceleration G Is greater.

Accordingly, in addition to the effect of (1), at the brake deceleration scene, it is possible to suppress the deceleration step (G step) generated by the disengagement of the lockup clutch 20, to a level equal to or smaller than an evaluation level permitted as the sensory evaluation of the occupant.

(3) The lockup control section 8a is configured to correct the lockup release vehicle speed (LU release vehicle speed) set by the permitted deceleration step (G step) to be lower as a vehicle sensitivity by a vehicle weight and a tire diameter is higher.

Accordingly, in addition to the effect of (2), at the brake deceleration scene, it is possible to suppress the deceleration step (G step) generated by the disengagement of the lockup clutch 20, to a level equal to or smaller than an evaluation level permitted as the sensory evaluation of the occupant, irrespective of the high or low vehicle sensitivity.

(4) The lockup control section 8a is configured to correct the lockup release vehicle speed (LU release vehicle speed) set by the permitted deceleration step (G step) to be lower as a transmission gear ratio of the shift mechanism (variator 4) becomes a lower transmission gear ratio.

Accordingly, in addition to the effect of (2) or (3), at the brake deceleration scene, it is possible to suppress the deceleration step (G step) generated by the disengagement of the lockup clutch 20, to a level equal to or smaller than an evaluation level permitted as the sensory evaluation of the occupant, irrespective of the transmission gear ratio of the variator 4 at the LU disengagement.

(5) The lockup control section 8a is configured to set the transmission gear ratio of the shift mechanism (variator 4) to a look-ahead transmission gear ratio when the lockup release is assumed, without setting to the transmission gear ratio when the lockup release vehicle speed (LU release vehicle speed) is set.

Accordingly, in addition to the effect of (4), it is possible to accurately correct the lockup release vehicle speed (LU release vehicle speed) in accordance with the transmission gear ratio of the shift mechanism (variator 4).

(6) The lockup control section 8a is configured to perform a sensory evaluation of a deceleration inclination (G inclination) based on a pushed-out feeling with respect to an initial deceleration G when the lockup clutch 20 is disengaged, and thereby to previously set a limit line by a permitted sensory evaluation point; and the lockup control section 8a is configured to set an inclination of a hydraulic pressure (LU hydraulic pressure inclination) discharged at the disengagement of the lockup clutch to be greater as the permitted deceleration inclination (G inclination) determined based on the limit line with respect to the absolute value of the initial deceleration G is greater.

Accordingly, in addition to the effects of (1) to (5), at the brake deceleration scene, it is possible to suppress the deceleration inclination (G inclination) generated by the disengagement of the lockup clutch 20, to a level equal to or smaller than an evaluation level permitted as the sensory evaluation of the occupant.

Hereinabove, the lockup control device for the automatic transmission according to the first embodiment of the present invention is explained. However, the concrete configuration is not limited to this first embodiment. Variations, additions, and so on of the design can be permitted as long as they are included in the gist of the present invention in the claims.

In the first embodiment, the lockup control section 8a is configured to set the LU release vehicle speed and the LU hydraulic pressure inclination at the disengagement of the lockup clutch 20 in the brake deceleration scene. However, the lockup control section may be configured to set only the LU release vehicle speed at the disengagement of the lockup clutch in the brake deceleration scene.

In the first embodiment, the lockup control device according to the present invention is applied to the engine vehicle including the belt-type continuously variable transmission CVT which is the automatic transmission. However, the lockup control device according to the present invention may be applied to a vehicle including, as the automatic transmission, a stepwise transmission referred to as a step AT, a vehicle including a continuously variable transmission with an auxiliary transmission, and so on. Moreover, a vehicle to which the present invention is applied is not limited to the engine vehicle. The present invention is applicable to a hybrid vehicle including the engine and the motor which are traveling driving sources, an electric vehicle including the motor which is a traveling driving source, and so on.

The invention claimed is:

1. A lockup disengagement control device for an automatic transmission including a torque converter which is disposed between a traveling driving source and a shift mechanism, and which includes a lockup clutch configured to be engaged to directly connect an torque converter input shaft and a torque converter output shaft, and a lockup control section configured to perform a lockup engagement control and a lockup disengagement control of the lockup clutch, the lockup disengagement control device comprising:

when a brake is operated from a brake OFF to a brake ON during a coast traveling in an engagement state of the lockup clutch, the lockup control section being configured to sense an initial deceleration by the brake ON operation, and to set a lockup release vehicle speed to be higher as an absolute value of the initial deceleration is greater, and when a vehicle speed is sensed to be equal to or smaller than the set lockup release vehicle speed in a middle of a brake deceleration scene by the brake ON operation, the lockup control section being configured to disengage the lockup clutch.

2. The lockup disengagement control device for the automatic transmission as claimed in claim 1, wherein the lockup control section is configured to perform a sensory evaluation of a deceleration step with respect to the initial deceleration based on a pushed-out feeling when the lockup clutch is disengaged, and thereby to previously set a limit line by a permitted sensory evaluation point; and the lockup control section is configured to set the lockup release vehicle speed to a higher value as the permitted deceleration step determined based on the limit line with respect to the absolute value of the initial deceleration is greater.

3. The lockup disengagement control device for the automatic transmission as claimed in claim 2, wherein the lockup control section is configured to correct the lockup release vehicle speed set by the permitted deceleration step to be lower as a vehicle sensitivity by a vehicle weight and a tire diameter is higher.

4. The lockup disengagement control device for the automatic transmission as claimed in claim 2, wherein the lockup control section is configured to correct the lockup release vehicle speed set by the permitted deceleration step to be lower as a transmission gear ratio of the shift mechanism becomes a lower transmission gear ratio.

5. The lockup disengagement control device for the automatic transmission as claimed in claim 4, wherein the lockup control section is configured to set the transmission gear ratio of the shift mechanism to a look-ahead transmission gear ratio when the lockup release is assumed, without setting to the transmission gear ratio when the lockup release vehicle speed is set.

6. The lockup disengagement control device for the automatic transmission as claimed in claim 1, wherein the lockup control section is configured to perform a sensory evaluation of a deceleration inclination with respect to the initial deceleration based on a pushed-out feeling when the lockup clutch is disengaged, and thereby to previously set a limit line by a permitted sensory evaluation point; and the lockup control section is configured to set an inclination of a hydraulic pressure discharged at the disengagement of the lockup clutch to be greater as the permitted deceleration inclination determined based on the limit line with respect to the absolute value of the initial deceleration is greater.

* * * * *